United States Patent

Takikawa et al.

Patent Number: 5,882,699
Date of Patent: *Mar. 16, 1999

[54] VEHICULAR LIGHTING UNIT APPARATUS

[75] Inventors: Osami Takikawa; Tutomu Naito, both of Shizuoka, Japan

[73] Assignee: Koito Manufacturing Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 651,347

[22] Filed: May 22, 1996

Related U.S. Application Data

[62] Division of Ser. No. 421,254, Apr. 13, 1995, Pat. No. 5,546,285.

[30] Foreign Application Priority Data

Apr. 19, 1994 [JP] Japan .................................... 6-103205

[51] Int. Cl.$^6$ ................................................ B29C 45/34
[52] U.S. Cl. .......................... 425/546; 249/176; 425/577; 425/812
[58] Field of Search ..................... 425/555, 577, 425/808, 812, 542, 470, 546; 264/2.2; 249/176

[56] References Cited

U.S. PATENT DOCUMENTS

| | | | |
|---|---|---|---|
| 1,525,172 | 2/1925 | Eberhard | 249/176 |
| 2,408,629 | 10/1946 | Green | 425/555 |
| 4,447,372 | 5/1984 | Kreuttner | 264/2.2 |
| 4,990,077 | 2/1991 | Morita | 425/577 |
| 5,094,602 | 3/1992 | Morita | 425/130 |
| 5,443,778 | 8/1995 | Schlingman | 264/257 |
| 5,618,567 | 4/1997 | Hara et al. | 425/111 |

Primary Examiner—James P. Mackey
Attorney, Agent, or Firm—Fitzpatrick, Cella, Harper & Scinto

[57] ABSTRACT

A resin-made vehicular lighting unit having protruding portions is formed in a mold apparatus. The mold apparatus includes first and second molds which are used to form a cavity for resin-molding the vehicular lighting unit. Recessed portions are formed in the first mold and are used to form the protruding portions on a front surface side of the vehicular lighting unit. The second mold includes projecting members, each of which correspond to the recessed portions of the first mold.

2 Claims, 6 Drawing Sheets

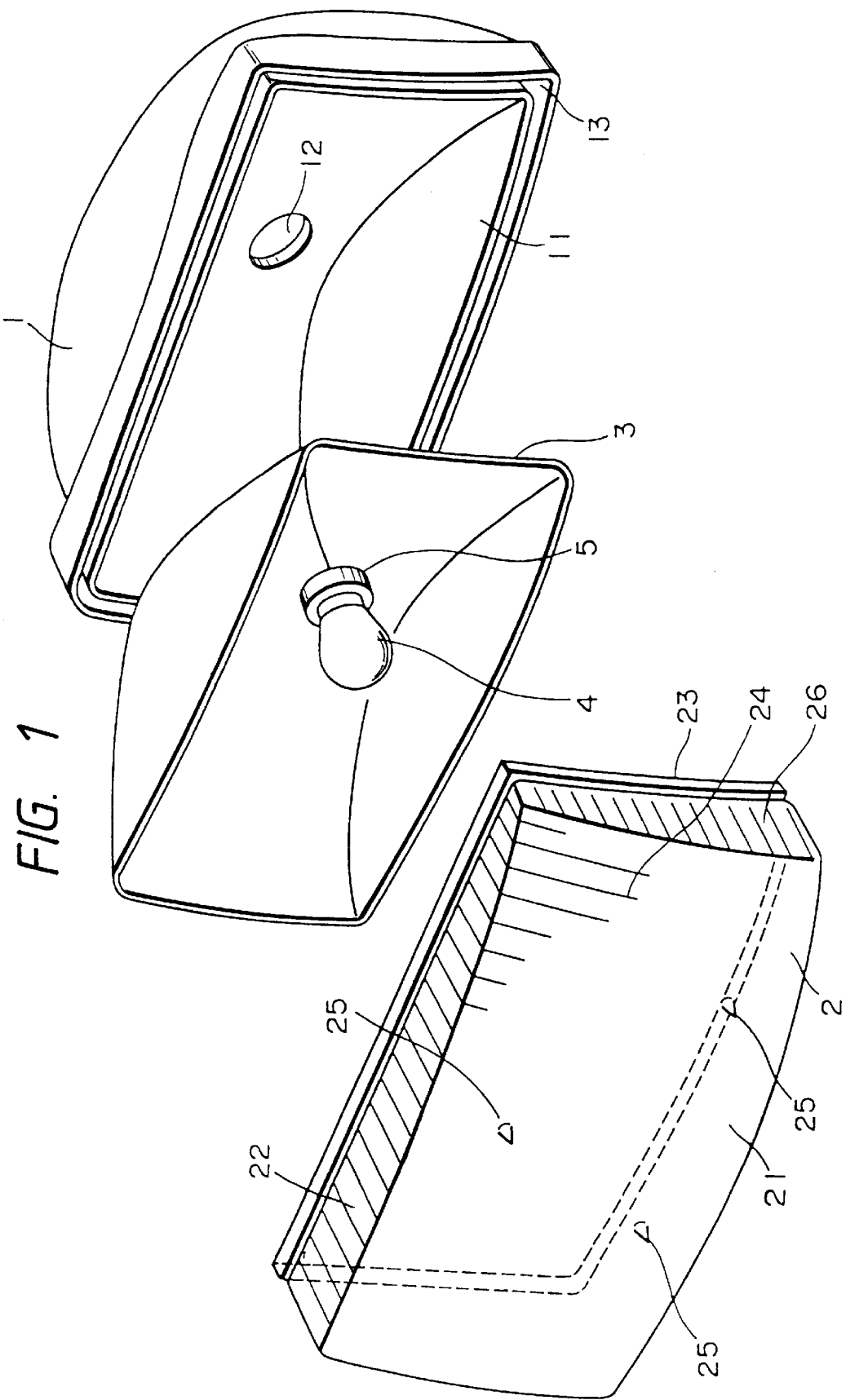

VEHICULAR LIGHTING UNIT APPARATUS

This application is a division of application Ser. No. 08/421,254 filed Apr. 13, 1995, now U.S. Pat. No. 5,546,285.

BACKGROUND OF THE INVENTION

1. Field of the Invention

The present invention relates to a vehicular lighting unit having a lens provided with aiming pads, utilized when an optical-axis inspection is made, and, more particularly, to an apparatus and method for producing a vehicular lighting unit whose lens is formed by resin-molding.

2. Related Background Art

In the prior art there has been proposed an optical-axis inspection apparatus, for inspecting the optical axis of an automobile headlight, as disclosed in, for example, U.S. Pat. No. 3,520,618. A method for inspecting the optical axis of a headlight comprises the steps of providing three aiming pads protruding from the front surface of the lens of such a headlight, forming a plane, having specific angles with the optical axis of the headlight, by connecting the tips of these aiming pads, and positioning an optical-axis inspection apparatus with respect to the headlight, by utilizing the plane having the specific angles so as to place the apparatus in position with respect to the headlight. This enables the optical axis of the headlight to be inspected properly.

FIG. 6 is a perspective view of a headlight having aiming pads such as those described above. A lens 2 is firmly secured by utilizing a sealing groove 13 formed along the peripheral edge of the front opening 11 of a lighting fixture body 1. A reflector 3, an electric bulb 4, and the like, are contained in a light chamber partitioned with the lighting fixture body 1 and the lens 2. The lens 2 is formed by injection-molding transparent resin into a so-called box lens, including a lens portion 21, whose configuration corresponds to the front opening of the lighting fixture body, a side portion 22, formed around the lens portion, and a sealing leg portion 23, provided at the end edge of the side portion and utilized when the lens portion is fitted to the lighting fixture body. In addition, three aiming pads 25 protrude forward from three places of the surface of the lens portion 21. As shown in a partial exploded perspective view of FIG. 7(a), each of the aiming pad 25 is a protrusion formed by locally increasing the thickness of a part of the lens portion 21.

The headlight is formed by fitting the lens 2, having the three aiming pads 25, to the lighting fixture body 1 and mounting it on an automobile. An optical-axis inspection apparatus 200, shown in FIG. 8, is then set opposite to the front of the headlight, and the leading edge faces of rods 201–203, provided in the optical-axis inspection apparatus 200, are each arranged to abut against the three aiming pads 25, so that the optical-axis inspection apparatus 200 may be positioned with respect to the plane specified by the tip of each aiming pad 25. Moreover, the optical-axis inspection apparatus 200 may be positioned in a specific direction with respect to the optical axis O. In this case, two out of the three rods 201–203, each abutting against the aiming pads 25, are made movable in the axial direction, whereby the optical-axis inspection apparatus 200 can properly be set opposite to the optical axis of a vehicular lighting unit on various specific planes.

When a lens having aiming pads as described above is made by injection-molding, resin-molding gates are normally designed so that they are placed at the end edge of a sealing leg portion 23. For this reason, when injection molding is conducted, the resin injected from the gates, into a cavity with molds, flows from the gates into various portions to fill up the cavity. Since a portion extending from the sealing leg portion 23 up to the lens portion 21 is substantially uniform in thickness, the resin flows relatively smoothly. However, the cavity in a portion where the aiming pad 25 exists is deeper than the remainder of the cavity, and therefore the flow of the resin in this area tends to become slow and disturbed.

Therefore, there arises a phenomenon in which the disturbance in the flow of resin causes the portion corresponding to the presence of the aiming pad 25 to be surrounded with the resin, resulting in part of the air in the cavity in the portion corresponding to the aiming pad 25 being trapped. When the air trapped therein is forced to escape from the cavity through the resin, the resin undergoes pulsating non-uniformity and causes weld lines W to be produced in the lens portion 21 close to the aiming pad 25 (see FIG. 6). Such weld lines deteriorate not only the external appearance of the lens portion 21, but also the quality of the headlight. Moreover, weld lines that become conspicuous cause light to scatter therein and also deteriorates light distribution characteristics.

Since the aiming pad 25 is made thicker than the lens portion 21, the surface side of the aiming pad 25 cools quickly after the injection molding is terminated, while the inside is subsequently cooled. When the inside of the aiming pad 25 is cooled, its volume shrinks, and as shown in FIG. 7(b), the leading end portion of the aiming pad 25 is deformed in the form of a recess and a so-called "sink mark" H appears. When such a "sink mark" appears, the leading end of the aiming pad 25 recedes by a length of S from the original position, the plane formed with the three aiming pads 25 fails to conform to the designed plane and an accurate optical-axis inspection becomes impossible.

SUMMARY OF THE INVENTION

An object of the present invention is to provide a vehicular lighting unit, including aiming pads, free from weld lines.

Another object of the present invention is to provide a vehicular lighting unit, including aiming pads free from "sink marks."

Still another object of the present invention is to provide an apparatus capable of producing a lens, free from weld lines and "sink marks", by injection molding.

A further object of the present invention is to provide a method for producing a lens, free from weld lines and "sink marks", by injection molding.

According to the present invention, a vehicular lighting unit has aiming pads, each integrally protruding from the surface of a resin-made lens, wherein a recessed part is provided in the rear face of each aiming pad. The recessed part is similar in its outer configuration to the aiming pad by making the thickness of the aiming pad uniform along its surface configuration.

According to the present invention, an apparatus for producing a vehicular lighting unit includes a pair of molds for use in forming a cavity for resin-molding a lens, wherein recessed portions for use in forming aiming pads are formed in one mold positioned on the surface side of the lens, whereas projections, each corresponding to the recessed portions, are formed in the other mold.

A through-hole, communicating with the outside of the one mold, is formed in the bottom surface of each recessed portion. An insert pin is passed through that hole, and a very small gap is formed between the through-hole and the insert pin.

According to the present invention, a method for producing a vehicular lighting unit, having aiming pads, each integrally protruding from the surface of a resin-made lens, the aiming pads being subjected to an optical-axis inspection, comprises the steps of forming aiming pads in one of the molds in a pair of molds for use in resin-molding a lens, forming a through-hole communicating with the outside of the one mold in the bottom surface of each recessed portion, providing an insert pin passed through the hole to form a very small gap therebetween, providing a projection corresponding to the recessed portion in the other mold, and injecting resin into a cavity for use in partitioning the recessed portion and the projection.

The recessed part provided in the rear face of each aiming pad prevents the wall thickness of the aiming pad from being greater than that of the remaining portion of the lens and makes the thickness of the aiming pad uniform. When the resin-molding is carried out, a disturbance in the flow of resin is avoided, thereby restraining the appearance of not only weld lines, but also "sink marks," so that dimensionally accurate aiming pads may be formed.

Moreover, the cavity can communicate with the outside of the mold, via the through-hole of the mold for use in forming the aiming pad, to ensure that weld lines are prevented from being produced since air is not trapped in the aiming pad when the resin-molding is carried out.

BRIEF DESCRIPTION OF THE DRAWINGS

FIG. 1 is a partial exploded perspective view of a headlight in accordance with preferred embodiment of the present invention.

DETAILED DESCRIPTION OF THE PREFERRED EMBODIMENTS

Figure 2A:
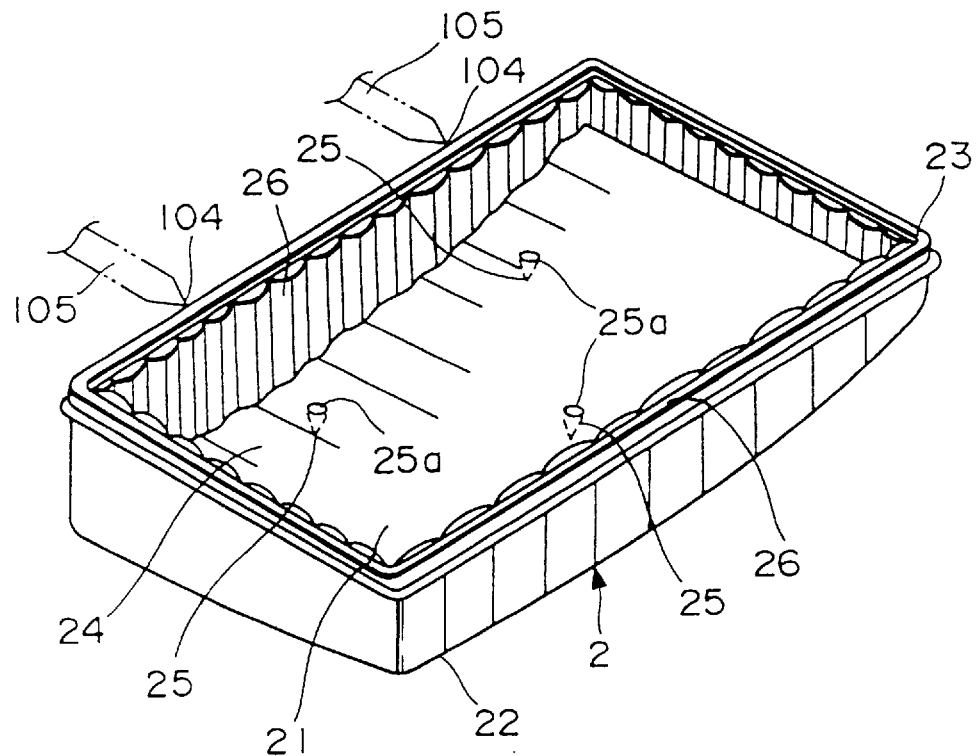
FIG. 2, consisting of 2(a) and 2(b), is a perspective view of a lens according to the present invention as viewed from its back (FIG. 2(a)) and a partial exploded enlarged perspective view of the lens (FIG. 2(b)).

Referring to the drawings, a preferred embodiment of the present invention will now be described. FIG. 1 is a partial cutaway perspective view of a headlight unit of an automobile to which the present invention is applied. The headlight unit, which has been integrally molded out of black resin, comprises a lighting unit body 1 having a rectangular front opening 11 and a back hole 12 for use in inserting an electric bulb, a lens 2 for forming a lighting chamber fitted to the front-side opening of the lighting unit body 1, a reflector 3 furnished in the lighting chamber thus partitioned and supported with the lighting unit body 1, and an electric bulb socket 5 for supporting an electric bulb 4 with the reflector 3, the electric bulb 4 being placed at the focal position of the reflector 3.

The lens 2 is formed by injection-molding transparent resin and includes a lens portion 21 whose configuration corresponds to that of front opening 11 of the lighting unit body 1, a side portion 22 formed around the lens portion 21, a sealing leg portion 23 formed along the edge of the side portion 22 and utilized when it is fitted to the lighting unit body 1, a lens step 24 mainly formed on the inner face of the lens portion 21, and an aiming pad 25 protruding from the outer surface of the lens portion 21 at three places. In addition, in this example a semi-cylindrical lens step 26, extending in the direction of the optical axis, is also formed on the inner side of the side portion 22 and is arranged peripherally and integrally.

The lens 2, whose sealing leg portion 23 is fitted into a sealing groove 13 formed along the peripheral edge of the front opening 11 of the lighting unit body 1, is mounted as usual in the lighting unit body 1 by filling up the sealing groove 13 with an adhesive (not shown) so as to fix the sealing leg portion 23.

Figure 2B:
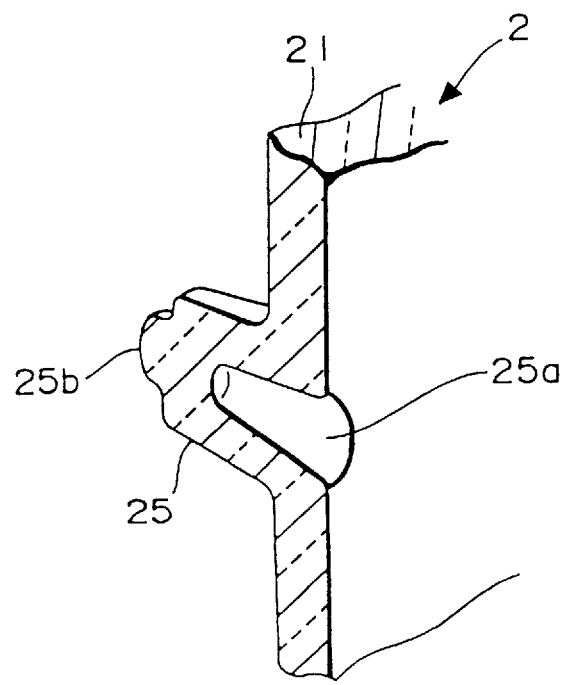

FIG. 2(a) is a perspective view of the lens 2 as viewed from its rear side and FIG. 2(b) an enlarged partial exploded perspective view of the aiming pad 25. As shown in these drawings, the aiming pads 25 protrude from the front surface side of the lens 2 while the thickness of a part of the lens portion 21 is kept constant. In other words, the aiming pad 25 has a rear recessed part 25a that is similar in its external configuration to the aiming pad 25. Moreover, the aiming pad 25 has an integral tapered fine diameter portion 25b whose leading edge face is partially spherical.

Figure 3:
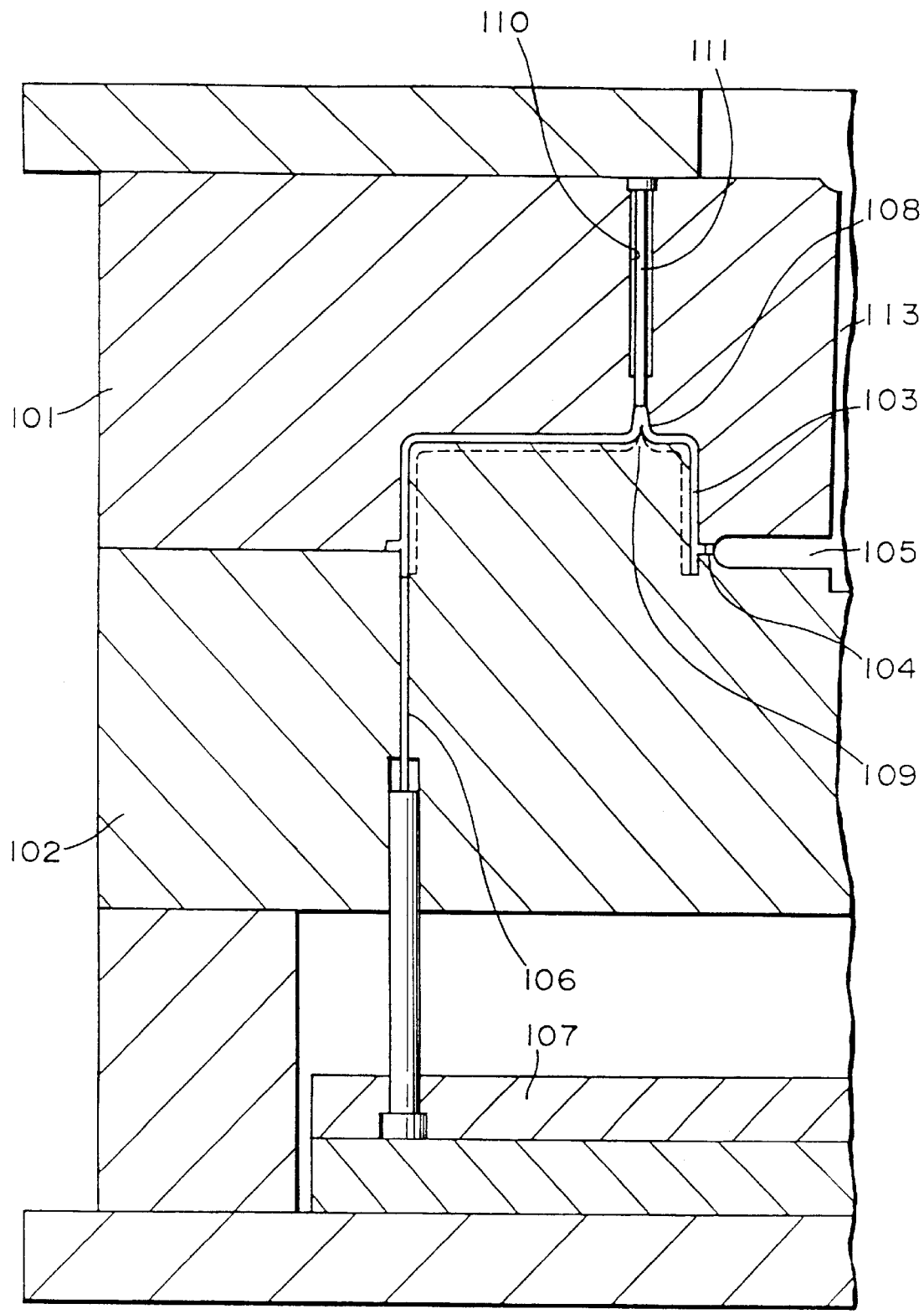
FIG. 3 is a sectional view of molds for resin-molding the lens.

FIG. 3 is a sectional view of a mold for use in forming the lens 2 by an injection molding technique. More specifically, a fixed mold 101 and a moving mold 102 are used for forming a cavity 103 for molding the lens 2. A plurality of gates 104, for use in injecting resin into a portion of the fixed mold 101 communicating with the cavity 103, that is, a portion corresponding to the sealing leg portion 23 of the lens 2, are opened at fixed intervals and communicate with runners 105 and a sprue 113. In FIG. 2(a) the positions of the gates 104 and the runners 105 are each shown by chain lines. The sprue 113 is connected to an injection nozzle fitted to an injection molding machine (not shown). On the other hand, an ejector pin 106 is provided in a part of the moving mold 102 in the cavity 103 corresponding to the sealing leg portion. The base portion of the ejector pin 106 is supported by an ejector plate 107. The moving mold 102 is separated from the fixed mold 101 after the lens is molded, and the ejector plate 107 is moved toward the moving mold so as to separate the lens sticking to the moving mold 102 by ejecting the lens with the tip of the ejector pin 106.

Figure 4:
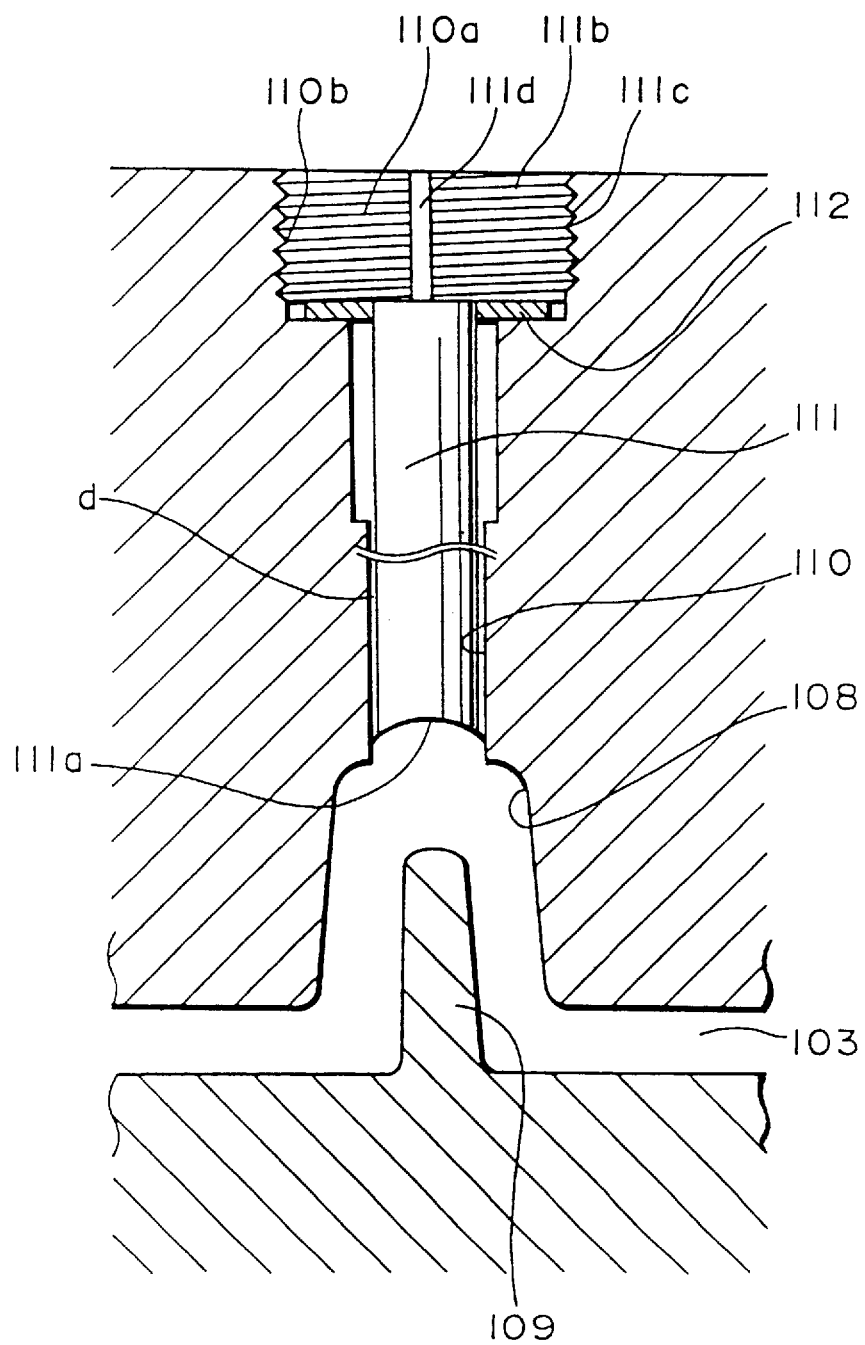
FIG. 4 is an enlarged view of a principal part of FIG. 3.

FIG. 4 is a partial enlarged view of FIG. 3, wherein a recessed portion 108, for use in forming the aiming pad 25, is formed in the fixed mold 101 in the cavity 103 corresponding to the aiming pad 25. A fine-diameter projection 109, substantially similar in configuration to the recessed portion 108, is provided in a part of the moving mold, so that the aiming pads 25 are each formed with the projections 109, the recessed portions 108 and the parts of the cavity 103. In addition, a straight through-hole 110, having a diameter smaller than that of the bottom of the recessed portion 108, is opened in the bottom of the recessed portion 108 provided in the fixed mold 101, and the through-hole is long enough to reach the bottom surface of the fixed mold 101 to allow the recessed portion 108 to communicate with the outside of the fixed mold 101. An insert pin 111 is passed through the through-hole 110.

The leading edge face 111a of the insert pin 111 has a spherical recessed face so as to form the spherical surface at the leading end 25b of the aiming pad 25. Moreover, the base portion 111b, of the insert pin 111, has a larger diameter and is made into a positive screw with a threaded groove 111c in the peripheral face and is screwed into a negative screw 110b formed in the large-diameter opening 110a provided at the opening end of the through-hole 110 of the fixed mold 101. In addition, an annular shim 112 is held between the base portion 111b, of the insert pin 111, and the opening 110a, of the through-hole 110, whereby it is made possible to adjust the facial position of the leading edge face 111a, of the insert pin 111, in the direction of the optical axis, within the through-hole 110.

The insert pin 111 is smaller in diameter than the inner diameter of the through-hole 110, and the difference therebetween causes a very small gap d, to be formed between the insert pin 111 and the through-hole 110, over the whole length of the through-hole 110. The cavity 103 can thus communicate with the outside of the fixed mold 101 via the small gap d, and air is also able to flow therethrough. In order to allow the air to flow freely through the gap d, an axial opening 111d is formed in the threaded groove 111c, of the base portion 111b, in the insert pin 111, and the annular shim 112 has an opening which is smaller in diameter than that of the opening 110a, whereas it is provided with a radial slit (not shown) in a part of its peripheral portion.

When the molds are used to make the lens by injection-molding, transparent resin is injected via the plurality of gates 104, into the cavity 103, and caused to flow therethrough, so that the cavity 103 is filled with the resin. At this time, the resin is caused to flow through the cavity 103 at a substantially equal velocity to fill it up and when the resin reaches the aiming pad 25, the flow is temporarily changed in accordance with the configuration of the cavity 103. Consequently, a part of the resin may stop flowing, thus trapping the air in the cavity. Since the part of the cavity corresponding to the aiming pad 25 has substantially the same thickness as that of the cavity corresponding to the lens 21, by means of the projection 109 provided on the moving mold 102 opposite to the recessed portion 108 of the fixed mold 101, the flow of resin in this portion is restrained from being disturbed. The air is thus prevented from being trapped in this portion and is not forced to escape through the resin; in other words, pulsating non-uniformity of resin and weld lines are not produced in the lens portion 2 close to the aiming pad 25.

The insert pin 111, used to form part of the cavity for the aiming pad 25, is provided with the small gap d over the through-hole 110, and the cavity 103 in the aiming pad portion communicates with the outside of the fixed mold 101 via the small gap d, so that the air likely to be trapped can escape from the mold through the gap d. As a result, it is ensured that no weld lines are produced in the aiming pad portions and the lens portion 2 close thereto based on air trapped therein.

Figure 5:
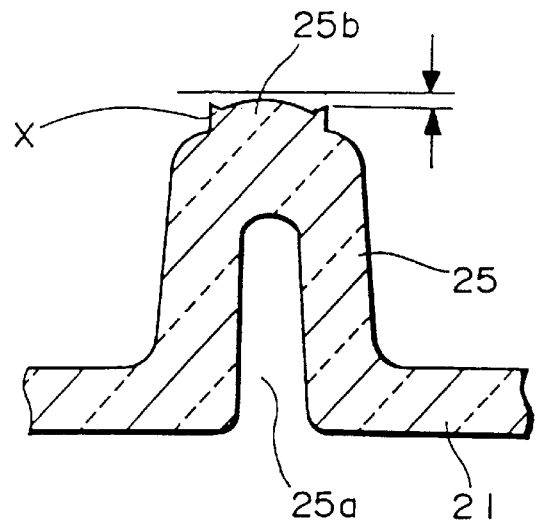
FIG. 5 is an enlarged sectional view of an aiming pad of the resin-molded lens.
Figure 6:
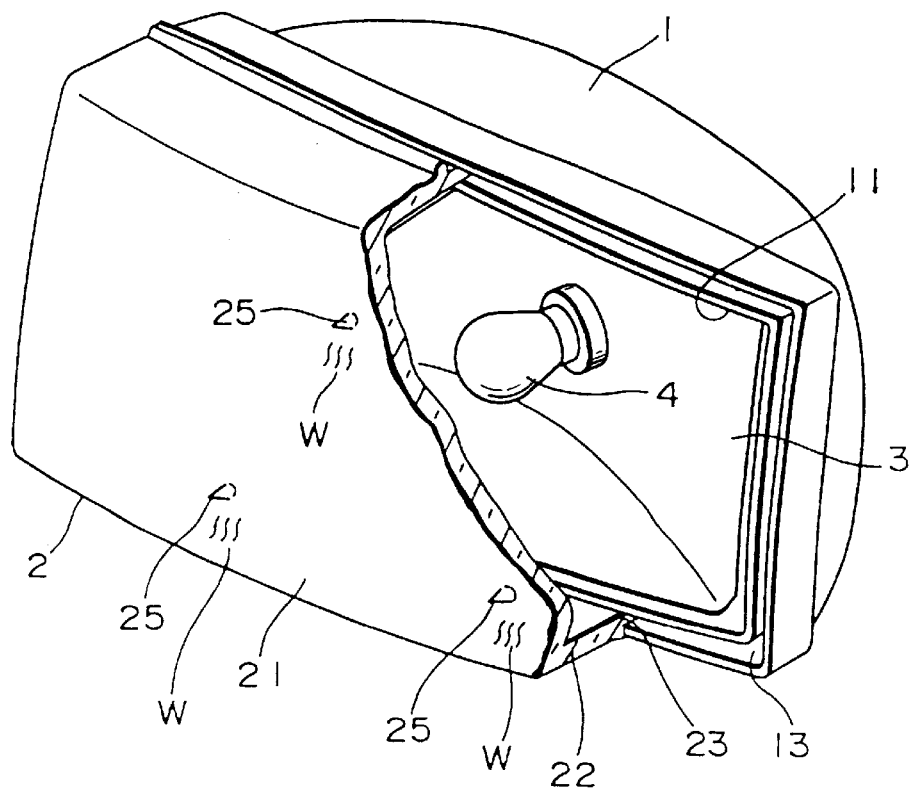
FIG. 6 is a perspective view of a representative lighting unit to which present invention is applicable.
Figure 7A:
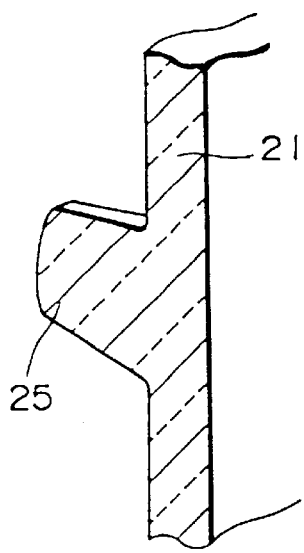
FIG. 7, consisting of 7(a) and 7(b), is a partial exploded perspective view of a lens in a conventional lighting unit (FIG. 7(a)) and a sectional view of a case where a sink mark is made (FIG. 7(b)).
Figure 7B:
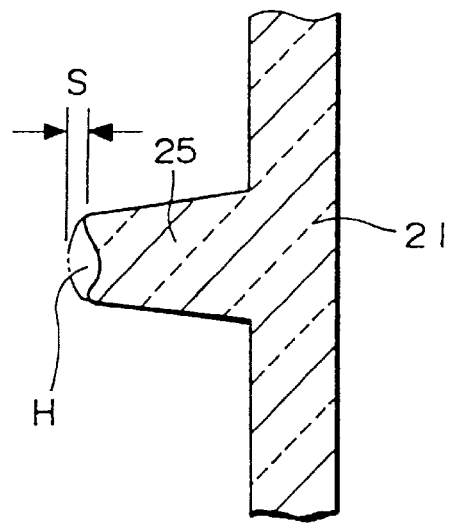
Figure 8:
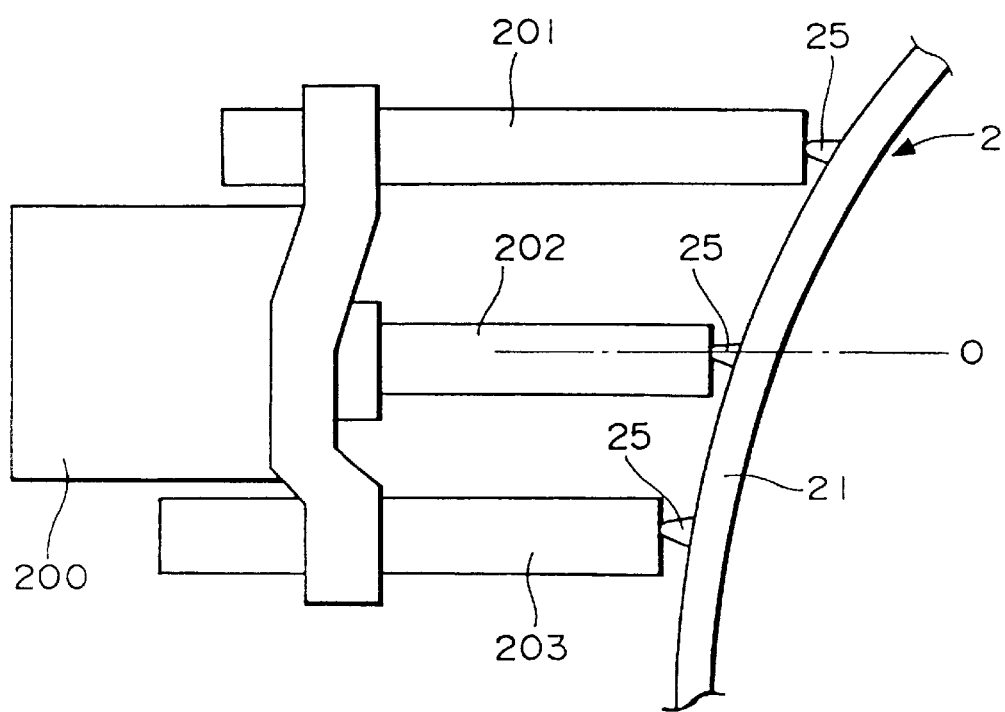
FIG. 8 is a diagram illustrating a state where an optical-axis inspection is made by means of aiming pads.

FIG. 5 is a sectional view of the aiming pad 25 of the lens 2 thus resin molded. Although a burr X may be produced around the leading end portion 25b of the aiming pad due to the very small gap d between the insert pin 111 and the through-hole 110, the burr X never protrudes further from the leading edge face than the edge face of the leading end portion 25b, which is spherical. Consequently, an optical axis inspection utilizing the leading edge face of the aiming pad 25 cannot be affected by a burr X. In addition, even if the burr X is scraped after the molding operation is completed, the leading edge face of the leading end portion 25b of the aiming pad 25 will not be affected thereby and is free from deformation.

By altering the thickness of the annular shim 112 inserted between the base portion 111b and the opening portion 110b of the through-hole 110, the insert pin 111 determines the position of the leading edge face of the aiming pad 25. The position of the leading edge face 111a, of the insert pin 111, in the through-hole 110, that is, the position of the bottom surface of the recessed portion 108, provided for the fixed mold 101, can be altered, whereby the vertical dimension of the aiming pad 25 to be molded thereby can be adjusted as desired.

On the other hand, the aiming pad 25 of the lens thus molded by the aforementioned molds is provided with the rear recessed part 25a by means of the projection 109 provided on the moving mold 102. Since the aiming pad 25 is formed substantially as thick as the remaining part of the lens portion 21, the resin never becomes locally thick in this portion. Consequently, little or no "molding sink" will be produced in the leading end portion 25b of the aiming pad 25, particularly in the leading edge face, even when that portion is cooled even after being molded. The external configuration of the aiming pad 25 is designable as intended so that a headlight unit, utilizing aiming pads 25, may be subjected to a desired optical axis inspection with precision.

As described above, according to the present invention, a recessed part, provided in the rear face of each aiming pad formed on the surface of the lens, prevents the wall thickness of the aiming pad from being greater than that of the remainder portion of the lens. When the resin-molding is carried out, the appearance of "sink marks" is restrained, so that dimensionally accurate aiming pads may be formed.

The recessed part is formed similar in its outer configuration to the aiming pad by making the thickness of the aiming pad uniform along its surface configuration so as to not only smooth the flow of resin in this portion and to restrain not only air from being trapped therein, by preventing the disturbance in the flow of resin, but also to prevent weld lines from being produced.

According to the present invention, the recessed portions for use in forming the aiming pads are formed in one mold for forming the lens, whereas projections, each corresponding to the recessed portions, are formed in the other mold. Consequently, the aiming pad having the recessed portion in the back can be resin-molded.

Moreover, the through-hole communicating with the outside of the mold is formed in the bottom surface of each recessed portion of the mold. A very small gap is formed between the through-hole and the insert pin, and the cavity can communicate with the outside of the mold via the through-hole to ensure that weld lines are effectively prevented from being produced since air is not trapped in the aiming pad when the resin-molding is carried out.

According to the present invention, a lens free from weld lines near the aiming pads can be produced through the method comprising the steps of forming aiming pads in one of the molds in a pair of molds used in resin-molding the lens, forming a through-hole communicating with the outside of the one mold in the bottom surface of each recessed portion, providing an insert pin passed through the hole to form a very small gap therebetween, providing a projection corresponding to the recessed portion in the other mold, and injecting resin into the cavity for use in partitioning the recessed portion and the projection.

What is claimed is:

1. A mold apparatus for producing a resin-made vehicular lighting unit having a plurality of protruding portions on a front surface side of the vehicular lighting unit, comprising:
    a pair of molds, consisting of a first mold and a second mold, for use in forming a first cavity of a predetermined thickness for resin-molding the vehicular lighting unit;
    a plurality of pin-shaped recessed portions, for use in forming the plurality of protruding portions on the front surface side of the vehicular lighting unit, being formed in the first mold;
    a plurality of pin-shaped projecting members, each corresponding to the plurality of pin-shaped recessed portions, being formed in the second mold;
    a through-hole communicating with the outside of the first mold being formed in a bottom surface of each of the plurality of pin-shaped recessed portions, wherein an insert pin is passed through the through-hole and wherein a very small gap is formed between the through-hole and the insert pin; and
    a plurality of second cavities, each having substantially a same predetermined thickness as the first cavity, being formed by the spaces between the recessed portions of the first mold and the projecting members of the second mold.

2. A mold apparatus as claimed in claim 1, further comprising:
    a plurality of runners for receiving resin, and disposed at predetermined locations adjacent the first cavity and spaced from the second cavities by predetermined distances.

* * * * *

UNITED STATES PATENT AND TRADEMARK OFFICE
CERTIFICATE OF CORRECTION

PATENT NO. : 5,882,699

DATED : March 16, 1999

INVENTOR(S) : OSAMI TAKIKAWA ET AL.

It is certified that error appears in the above-identified patent and that said Letters Patent is hereby corrected as shown below:

ON TITLE PAGE ITEM:

[57] ABSTRACT    line 8, "correspond" should read--corresponds--.

[73] ASSIGNEE: "Tokyo" should read --Shizuoka--.

COLUMN 1 line 44, "pad" should read --pads--.

Signed and Sealed this

Thirtieth Day of November, 1999

Attest:

Attesting Officer

Q. TODD DICKINSON

Acting Commissioner of Patents and Trademarks